United States Patent [19]

Cucinotta et al.

[11] Patent Number: 4,662,497
[45] Date of Patent: May 5, 1987

[54] FRICTION CLUTCHES

[75] Inventors: Luigi Cucinotta, Ancona; Pietro Caracini, Marches, both of Italy

[73] Assignee: Automotive Products plc, Leamington Spa, England

[21] Appl. No.: 718,482

[22] Filed: Apr. 1, 1985

[30] Foreign Application Priority Data

Apr. 2, 1984 [IT] Italy .................................. 20345A/84

[51] Int. Cl.⁴ ............................................. F16D 13/69
[52] U.S. Cl. ............................... 192/70.28; 192/70.18; 192/89 B
[58] Field of Search .................... 192/70.2, 70.18, 70.3, 192/70.27, 70.28, 70.29, 89 B, 109 R, 109 A, 70.11, 70.13

[56] References Cited

U.S. PATENT DOCUMENTS

| 2,085,965 | 7/1937 | Forrest | 192/70.16 |
| 3,191,734 | 6/1965 | Batchelor et al. | 192/70.14 |
| 4,431,097 | 2/1984 | Scheer | 192/70.28 |

FOREIGN PATENT DOCUMENTS 0048563 9/1981 European Pat. Off. .
0075387 8/1982 European Pat. Off. .

Primary Examiner—George H. Krizmanich
Attorney, Agent, or Firm—Solon B. Kemon

[57] ABSTRACT

A friction clutch comprises a driving member incorporating first and second cover members joined together and forming an enclosure therebetween. Within the enclosure are a first driven plate, an intermediate pressure plate, a second driven plate and a main pressure plate. In the engaged condition these components are all clamped together by a belville spring. A release rod acts on the main pressure plate to move it against the spring and release the clutch. The main pressure plate is driven by straps from the second cover member while the intermediate pressure plate is similarly driven by straps from the first cover member. This arrangement allows the clutch to be handled in two major sub-assemblies. The first of these includes the second cover member, the spring and the main pressure plate. The second incorporates the intermediate pressure plate and the first cover member. The first driven plate has to be positioned between the first cover member and the intermediate pressure plate prior to assembly of these components. The nature of these sub-assemblies simplifies handling and assembly of the clutch into a vehicle.

10 Claims, 5 Drawing Figures

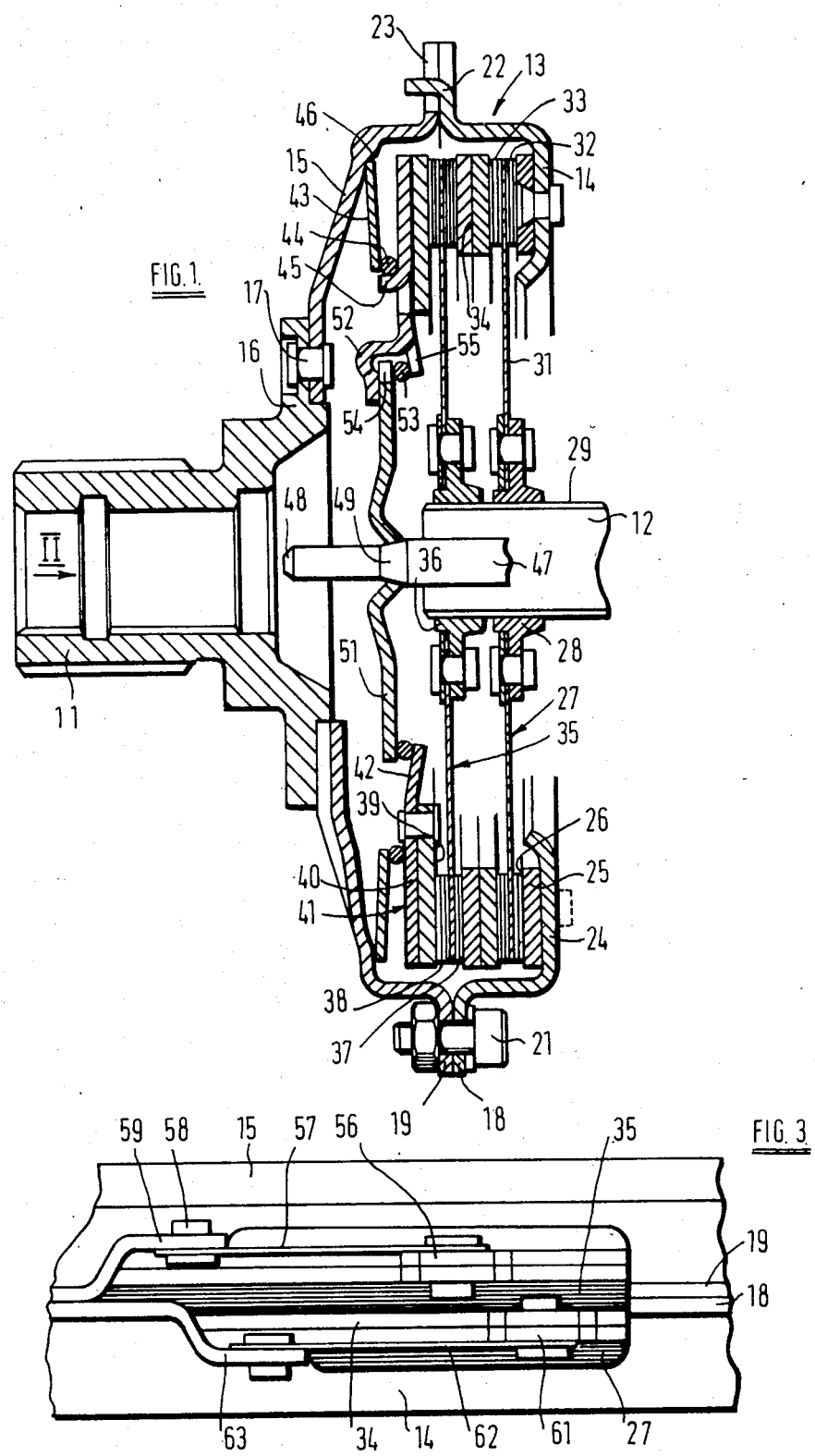

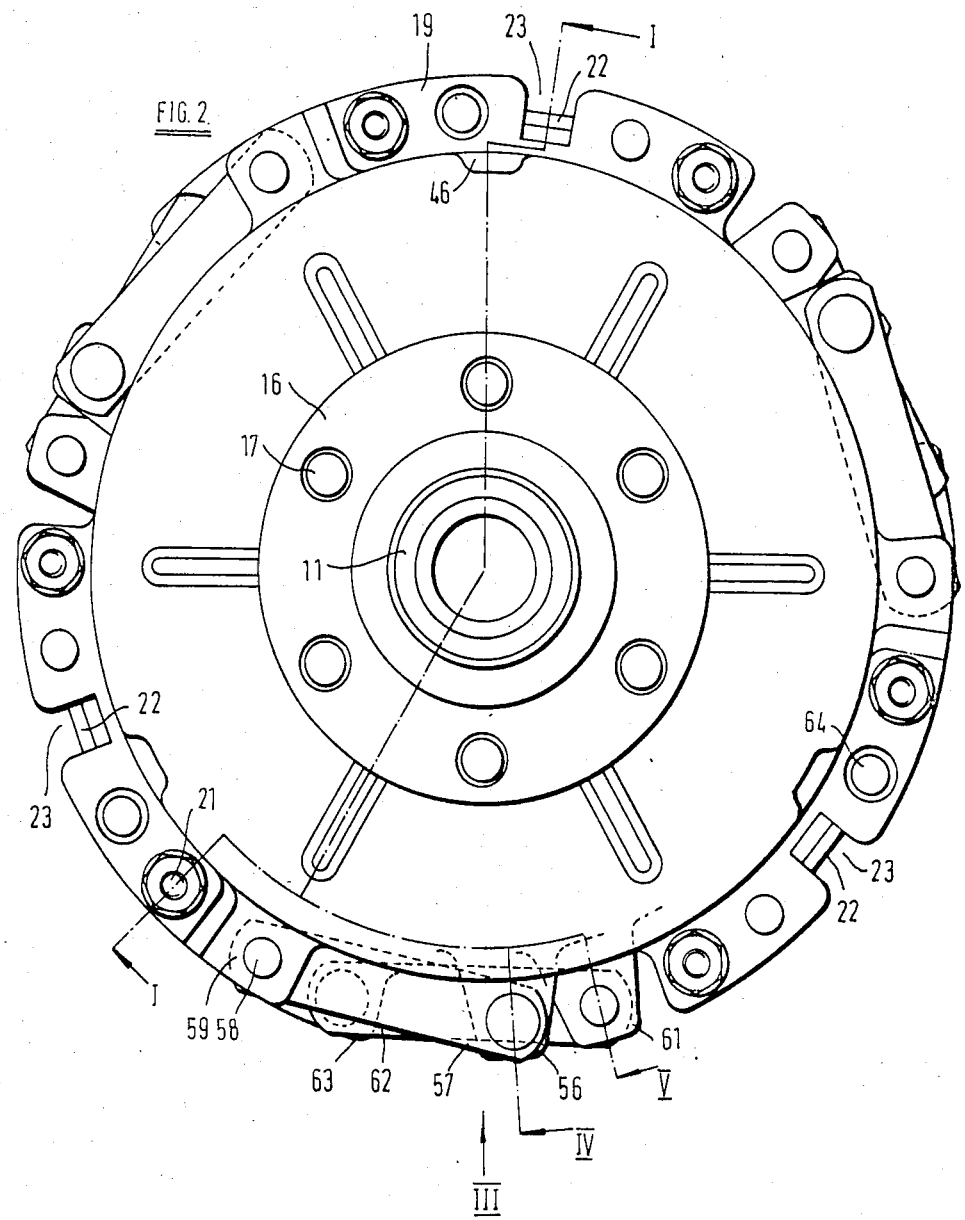

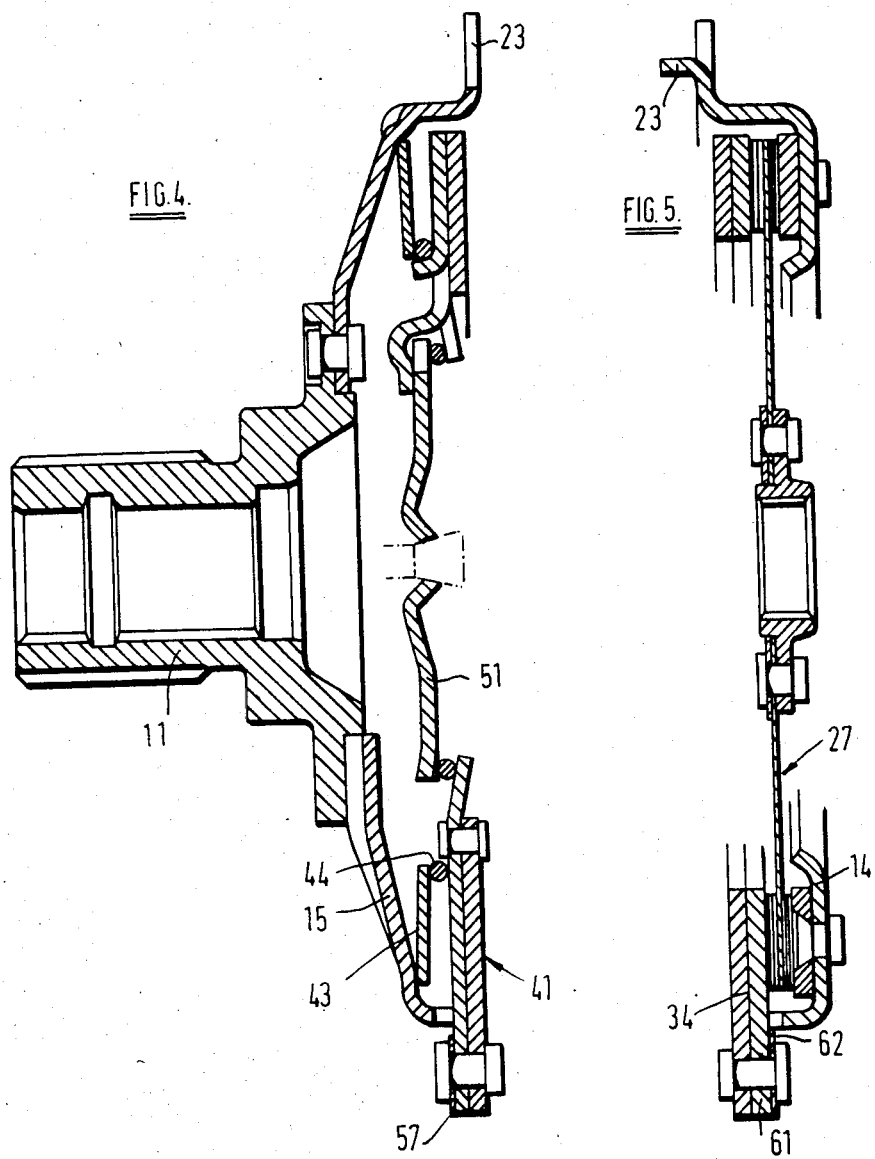

FRICTION CLUTCHES

BACKGROUND OF THE INVENTION

The invention relates to friction clutches.

The invention is concerned with twin-plate clutches, that is clutches which are used with two driven plates, one of which is clamped between a driving member and an intermediate pressure plate and the other of which is clamped between the intermediate pressure plate and a main pressure plate to provide drive to the driven plates, the main pressure plate being loaded resiliently to provide the required clamping force. When assembling such a clutch in its typical position between an engine and a gearbox, it is desirable to have the components thereof pre-assembled into sub-assemblies to simplify the installation.

In the installation of such a clutch in a motor-cycle, it is often necessary to have access to the interior of the driving member, without the encumberance of the driven plates, when first installing the driving member or a large part thereof in the rest of the vehicle. This makes it necessary to start the assembly of the clutch with engine and gearbox with the clutch broken down into components or sub-assemblies allowing the driving member to be mounted and secured in position whilst the driven plates are separate therefrom.

An object of the present invention is to provide a friction clutch which can be installed conveniently.

SUMMARY OF THE INVENTION

According to the present invention there is provided a friction clutch comprising a driving member incorporating first and second cover member joined together and forming an enclosure therebetween, the first cover member having an annular friction face facing the interior of the enclosure, an intermediate pressure plate within the enclosure having two opposed annular friction faces and a main pressure plate within the enclosure having an annular friction face facing towards the intermediate pressure plate, the friction faces being such that a first driven plate can be frictionally engaged between the first cover member and the intermediate pressure plate and a second driven plate can be engaged between the intermediate pressure plate and the main pressure plate, resilient means acting between the second cover member and the main pressure plate to cause the pressure plates to engage the driven plates, and drive straps interconnecting each pressure plate with the driving member so as to transmit rotary drive to the pressure plates whilst allowing axial movement thereof, wherein the drive straps of the intermediate pressure plate are connected to the first cover member and the drive straps of the main pressure plate are connected to the second cover member, whereby prior to assembling the first and second cover members together, the second cover member, resilient means and main pressure plate form one sub-assembly and the first cover member and intermediate pressure plate form another sub-assembly.

Preferably the first and second cover members are joined to each other by external flanges and drive straps are secured to the respective flange.

Preferably each flange has stepped back portions to which drive straps are secured at positions offset from the junction between the two cover members.

Preferably the resilient means is constituted by a belville spring.

A clutch release mechanism may act directly on the main pressure plate in opposition to the resilient clamping means. The drive straps of the intermediate pressure plate may then tend to move the intermediate pressure plate to a position where it is not in engagement with either driven plate.

Both cover members of the driving member may be constituted by sheet steel pressings. The two pressings may be joined together by flanges and these flanges may incorporate three location means, each comprising a slot in one cover member and a corresponding tongue on the other cover member.

BRIEF DESCRIPTION OF THE DRAWINGS

An embodiment of the invention will now be described by way of example only with reference to the accompanying drawings in which:

FIG. 1 is a cross-section on line I-I of FIG. 2 through a friction clutch in accordance with the invention;

FIG. 2 is an end view in the direction of arrow II of FIG. 1;

FIG. 3 is a view of part of the clutch in the direction of arrow III of FIG. 2;

FIG. 4 is a view corresponding generally to FIG. 1, but on section I-IV, showing one subassembly; and FIG. 5 is a view corresponding generally to FIG. 1, but on section line I-V, showing another subassembly.

DESCRIPTION OF A PREFERRED EMBODIMENT

The clutch shown in the drawings is intended to provide a driving connection between an engine-driven input shaft 11 and an output shaft 12 which in turn drives the input to a gearbox.

The clutch comprises a driving member 13 incorporating first and second pressed steel cover members 14 and 15. Cover member 15 is mounted on a flange 16 of shaft 11 by rivets 17. The two cover members are generally of dished annular form with external flanges 18 and 19 respectively. They are joined together to form the driving member by bolts 21 passing through the flanges 18 and 19 and by three bent over lugs 22 formed in flange 18 and engaged in corresponding slots 23 in flange 19. This arrangement provides accurate location between the two cover members 14 and 15. Cover members 14 and 15 thus together form an enclosure within which other components of the clutch are contained.

Cover member 14 incorporates a flat radial part 24 to which a flat annular member 25 is rivetted to provide an annular friction face 26 on cover member 14. A first driven plate 27 incorporates a splined hub 28 engaged on splines 29 of shaft 12, a facing carrier 31 and two annular friction facings 32 and 33 carried on the outer periphery of the carrier. Facing 32 has a face which co-operates with friction face 26. Facing 33 has a friction face which co-operates with a corresponding friction face on an intermediate pressure plate 34. The intermediate pressure plate is connected to the driving member 13 in a manner to be described subsequently such that it can move axially with respect to the driving member and is constrained to rotate therewith.

A second driven plate 35 corresponds to the driven plate 27 and incorporates a hub 36 and friction facings 37 and 38. Friction facing 37 has a friction face co-operating with a corresponding friction face on the intermediate pressure plate 34 which is such that this intermediate pressure plate has two opposed annular friction faces. The other friction facing 38 has a friction face which co-operates with a friction face 39 of a main pressure plate 41. The structure of the main pressure plate is such that it has a flat annular steel member 40 rivetted to a thinner annular pressing 42 which has its inner edge shaped in a manner to be described subsequently.

An annular belville spring 43 acts between cover member 15 and main pressure plate 41. It engages with the pressure plate via a wire fulcrum ring 44 which is held in position on the cover by tabs 45. The outer periphery of the belville spring is located with respect to the cover member 15 by a series of locating pips 46 pressed into the cover member.

The main pressure plate 41 is mounted in a manner to be described such that it is driven for rotation with the driving member 13 but is movable axially.

With the friction clutch in the engaged condition as shown, spring 37 urges the main pressure plate 41, second driven plate 35, intermediate pressure plate 34 and first driven plate 27 towards cover member 14 in such a way that all of their friction faces engage together in pairs. In this way a frictional driving connection is established from the driving member and pressure plates to the driven plates.

In order to release the clutch, the main pressure plate 41 has to be moved in a direction away from driven plate 35 against the load of spring 43. The release mechanism by which this is achieved includes a release rod 47 which passes through the shaft 12, the shaft being hollow for this purpose. The release rod 47 has a narrow nose 48 to facilitate assembly and a conical taper 49 which acts as a seat for a release plate 51. Release plate 51 is contoured to provide stiffness and its outer periphery engages with the inner edge of pressing 42 of the main pressure plate 41. Pressing 42 incorporates a series of bent out lugs 52 which provide circumferential and axial location for the plate 51. The release plate 51 is held in this position by a wire circlip 53 which engages against tabs 54 on the release plate and tabs 55 on the pressure plate pressing, these tabs being spaced to allow insertion of the release plate.

The location of and drive to the pressure plates is shown in FIGS. 2 and 3 and also FIG. 4 for the main pressure plate and FIG. 5 for the intermediate pressure plate. The main pressure plate 41 has three outwardly directed lugs 56 to each of which is rivetted a tangential flexible drive strap 57. Each of these drive straps is connected at its other end by a further rivet 58 to a lug 59 forming part of but bent back from the flange 19. The three drive straps locate the main pressure plate axially with respect to the driving member and also provide a rotational drive so that the pressure plate rotates with the driving member. In a similar way lugs 61 on intermediate pressure plate 34 are connected through straps 62 to bent out lugs 63 of the flange 18 of cover member 14. In this way, both pressure plates can move axially by deflection of their drive straps in order to allow the clutch to be engaged and disengaged. On release of the clutch, it is desirable that the intermediate pressure plate 33 should be lifted slightly away from the cover member 14 to assist complete disengagement of the drive to driven plate 27. The drive straps 62 act as springs and are set to cause such a release as the clutch as a whole is released.

FIGS. 4 and 5 show major sub-assemblies of the clutch and make it clear that the main pressure plate 41, belville spring 43 and cover member 15 form the major parts of one sub-assembly while intermediate pressure plate 34 and cover member 14 form major parts of the other sub-assembly. In effecting assembly between cover member 14 and pressure plate 34, it is necessary to insert driven plate 27 between these members before effecting the final assembly through the drive strap rivets. In practice, to assemble the clutch into a motorcycle engine and gearbox unit, the release plate 51 is removed to allow easy access to the end of shaft 11 to enable it to be assembled appropriately to the drive from an engine. This may for example require hollow shaft 11 to be slid over another shaft and secured in position by a nut and lock washer. Release plate 51 is then re-assembled into the sub-assembly of FIG. 4. The sub-assembly of FIG. 5 is then offered up to the sub-assembly of FIG. 4 with the driven plate 35 therebetween, using usual procedures to centralise the two driven plates. Thereafter, the gearbox assembly can be assembled to the engine and clutch assembly, this involving insertion of splined shaft 12 into the splined hubs of the driven plates. Release rod 47 may then be slid through hollow shaft 12.

By arranging to drive the main pressure plate through straps from one cover member and the intermediate pressure plate through straps from the other cover member, a situation is achieved whereby much of the assembly of the clutch can be carried out as a clutch assembly rather than as part of the final vehicle assembly. Particularly as clutches and vehicles are normally assembled in different plants, the assembly procedures provide significant advantages.

The clutch of the invention as shown in the drawings also has the advantage of simplicity in that it is constituted almost entirely of steel pressings and flat steel members which can be blanked out from sheet steel. Furthermore, the means for assembling the two cover members together provides accurate location between these members in a very simple manner.

Balance weights such as 64 may be added as required in the completed clutch.

We claim:

1. A friction clutch comprising: a driving member incorporating first and second cover members and means joining said cover members together, said cover members forming an enclosure therebetween and the first cover member having an annular friction face facing the interior of the enclosure; an intermediate pressure plate within the enclosure having opposed annular friction faces; a main pressure plate within the enclosure having an annular friction face facing towards the intermediate pressure plate; a first driven plate having opposed friction faces cooperating with the friction face of the first cover member and one of the friction faces of the intermediate pressure plate; a second driven plate having opposed friction faces co-operating with the other friction face of the intermediate pressure plate and the friction face of the main pressure plate; resilient means acting between the second cover member and the main pressure plate to cause the pressure plates to engage frictionally with the driven plates; first drive straps interconnecting the intermediate pressure plate with the first cover member and second drive straps interconnecting the main pressure plate with the second cover member whereby rotary drive is transmitted to the pressure plates from the driving member and whereby prior to assembling the first and second cover members, the second cover member, resilient means and main pressure plate form one sub-assembly and the cover member and intermediate pressure plate form another sub-assembly.

2. A friction clutch according to claim 1 wherein the means joining said cover members comprise external flanges and wherein said drive straps are secured to the respective flange.

3. A friction clutch according to claim 2 wherein each flange has stepped back portions to which the drive straps are secured at positions offset from a junction between the two cover members.

4. A friction clutch according to claim 1 wherein the resilient means is a belville spring.

5. A friction clutch according to claim 1 further comprising a release mechanism acting directly on the main pressure plate to oppose the action of said resilient means.

6. A fricton clutch according to claim 5 wherein the first drive straps bias the intermediate pressure plate to a position where neither pressure plate is in driving engagement with a driven plate.

7. A friction clutch according to claim 1 wherein the cover members are steel pressings.

8. A friction clutch according to claim 2 incorporating locating means between the first and second cover members comprising slots in one member engaged by tongues of the other.

9. For a friction clutch comprising a driving member incorporating first and second cover members and means joining said cover members together, said cover members forming an enclosure therebetween and the first cover member having an annular friction face facing the interior of the enclosure, an intermediate pressure plate within the enclosure having opposed annular friction faces, a main pressure plate within the enclosure having an annular friction face facing towards the intermediate pressure plate, a first driven plate having opposed friction faces co-operating with the friction face of the first cover member and one of the friction faces of the intermediate pressure plate, a second driven plate having opposed friction faces co-operating with the other friction face of the intermediate pressure plate and the friction face of the main pressure plate, resilient means acting between the second cover member and the main pressure plate to cause the pressure plates to engage frictionally with the driven plates, first drive straps interconnecting the intermediate pressure plate with the driving member and second drive straps interconnecting the main pressure plate with the driving member whereby rotary drive is transmitted to the pressure plates from the driving member; a first subassembly comprising said first cover member, said intermediate pressure plate, said first driven plate and said first drive straps, said first drive straps interconnecting the intermediate pressure plate with the first cover member; and a second sub-assembly comprising said second cover member, said main pressure plate, said resilient means and said second drive straps, said second drive straps interconnecting the second pressure plate with the second cover member.

10. A method of assembling a friction clutch of the kind comprising a driving member incorporating first and second cover members and means joining said cover members together, said cover members forming an enclosure therebetween and the first cover member having an annular friction face facing the interior of the enclosure; an intermediate pressure plate within the enclosure having opposed annular friction faces; a main pressure plate within the enclosure having an annular friction face facing towards the intermediate pressure plate; a first driven plate having opposed friction faces co-operating with the friction face of the first cover member and one of the friction faces of the intermediate pressure plate; a second driven plate having opposed friction faces co-operating with the other friction face of the intermediate pressure plate and the friction face of the main pressure plate; resilient means acting between the second cover member and the main pressure plate to cause the pressure plates to engage frictionally with the driven plates; first drive straps interconnecting the intermediate pressure plate with the driving member and second drive straps interconnecting the main pressure plate with the driving member whereby rotary drive is transmitted to the pressure plates from the driving member; said method comprising the steps of forming a first sub-assembly comprising said first cover member, said intermediate pressure plate, said first driven plate and said first driven straps interconnecting the pressure plate with the first cover member and a second sub-assembly comprising said second cover member, said main pressure plate, said resilient means and said second drive straps interconnecting the main pressure plate with the second cover member; and thereafter assembling the first and second sub-assemblies together with said second driven plate therebetween.

* * * * *